(12) United States Patent
Scheibe

(10) Patent No.: US 7,490,812 B2
(45) Date of Patent: Feb. 17, 2009

(54) VALVE DEVICE HAVING A VALVE CONTROL MEMBER FORMED BY MOLDING

(75) Inventor: Ralf Scheibe, Kuenzelsau-Garnberg (DE)

(73) Assignee: Buerkert Werke GmbH & Co. KG, Ingelfingen (DE)

( * ) Notice: Subject to any disclaimer, the term of this patent is extended or adjusted under 35 U.S.C. 154(b) by 246 days.

(21) Appl. No.: 11/409,827

(22) Filed: Apr. 24, 2006

(65) Prior Publication Data

US 2006/0255306 A1 Nov. 16, 2006

(30) Foreign Application Priority Data

May 10, 2005 (DE) .................. 10 2005 021 583

(51) Int. Cl.
*F16K 11/04* (2006.01)

(52) U.S. Cl. ............ 251/298; 251/331; 251/335.2

(58) Field of Classification Search ........... 251/331, 251/335.2, 298

See application file for complete search history.

(56) References Cited

U.S. PATENT DOCUMENTS

| | | | | |
|---|---|---|---|---|
| 2,673,371 | A * | 3/1954 | Uhlig ................. | 251/331 |
| 2,936,776 | A * | 5/1960 | Veatch ............... | 251/331 |
| 3,011,758 | A * | 12/1961 | McFarland, Jr. ...... | 251/331 |
| 3,019,815 | A * | 2/1962 | Lenardon et al. ..... | 251/331 |
| 3,603,349 | A * | 9/1971 | Botnick .............. | 251/335.2 |
| 4,027,849 | A * | 6/1977 | Muller ............... | 251/235 |
| 4,986,308 | A | 1/1991 | Champseau | |
| 5,027,857 | A | 7/1991 | Champseix | |
| 5,160,117 | A * | 11/1992 | Besombes ............ | 251/331 |
| 5,246,199 | A * | 9/1993 | Numoto et al. ....... | 251/129.15 |
| 5,265,843 | A * | 11/1993 | Kleinhappl .......... | 251/331 |
| 6,000,416 | A * | 12/1999 | Kingsford et al. .... | 251/335.2 |
| 6,065,734 | A * | 5/2000 | Tackett et al. ...... | 251/64 |
| 6,126,140 | A * | 10/2000 | Johnson et al. ...... | 251/331 |
| 6,220,299 | B1 * | 4/2001 | Arvidsson et al. .... | 137/863 |
| 6,868,994 | B2 * | 3/2005 | Kawolics ............ | 251/331 |
| 2003/0034471 | A1 * | 2/2003 | Burrola et al. ...... | 251/64 |
| 2004/0074539 | A1 * | 4/2004 | Weis et al. ......... | 137/543 |
| 2005/0067023 | A1 * | 3/2005 | Palvolgyi ........... | 137/538 |

FOREIGN PATENT DOCUMENTS

| | | |
|---|---|---|
| DE | 35 03 357 C2 | 8/1996 |
| FR | 76 36923 | 7/1978 |
| GB | 2 399 616 | 9/2004 |
| WO | WO 98/55785 | 12/1998 |
| WO | WO 2004/025156 | 3/2004 |
| WO | WO 2004/064578 | 8/2004 |

* cited by examiner

*Primary Examiner*—John Bastianelli
(74) *Attorney, Agent, or Firm*—Stuart J. Friedman

(57) ABSTRACT

A valve device includes a housing body having a fluidic chamber which has at least one valve seat and a valve control member. The member includes a rigid frame having first and second opposed surfaces and being shaped with recesses, at least one of the recesses extending between the surfaces, a rigid actuating member and a flexible diaphragm on the first surface which is connected with the frame and actuating member by injection molding. The recesses are filled with, and sealing contours on the second surface are formed of, the diaphragm material. At least one valve body is formed by a section of the actuating member and a section of the diaphragm surrounding the actuating member. The valve control member is joined with the housing body so that the diaphragm closes and seals the fluidic chamber and the valve body is opposite the valve seat.

7 Claims, 4 Drawing Sheets

Fig. 1
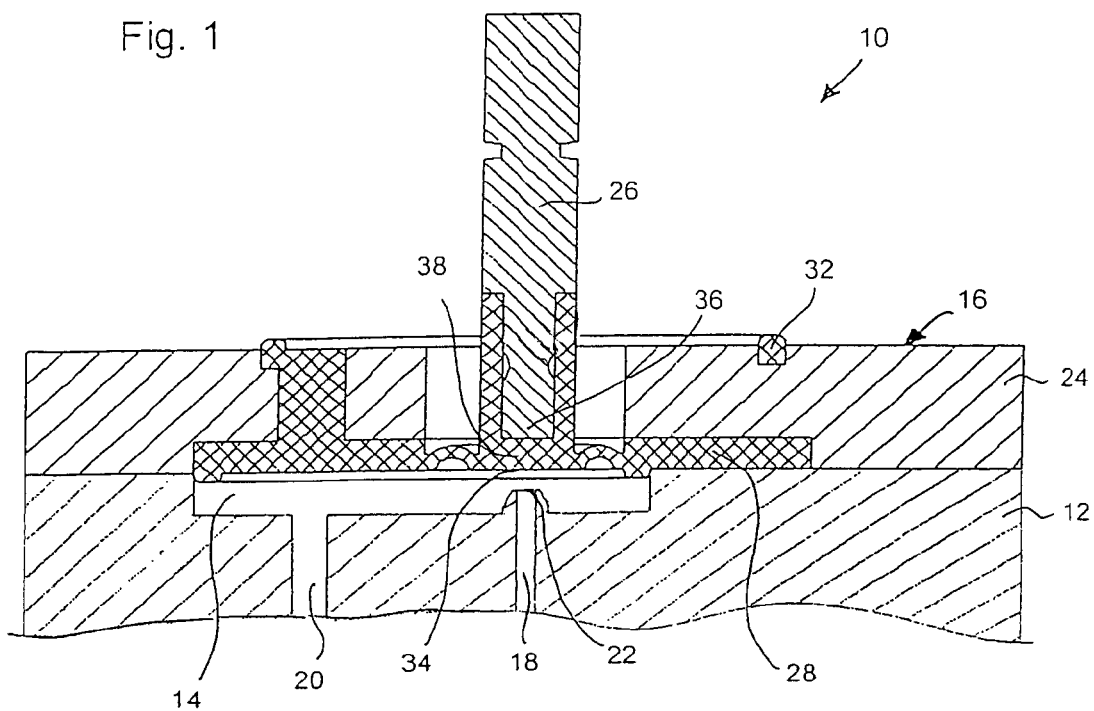
Fig. 2
Fig. 3
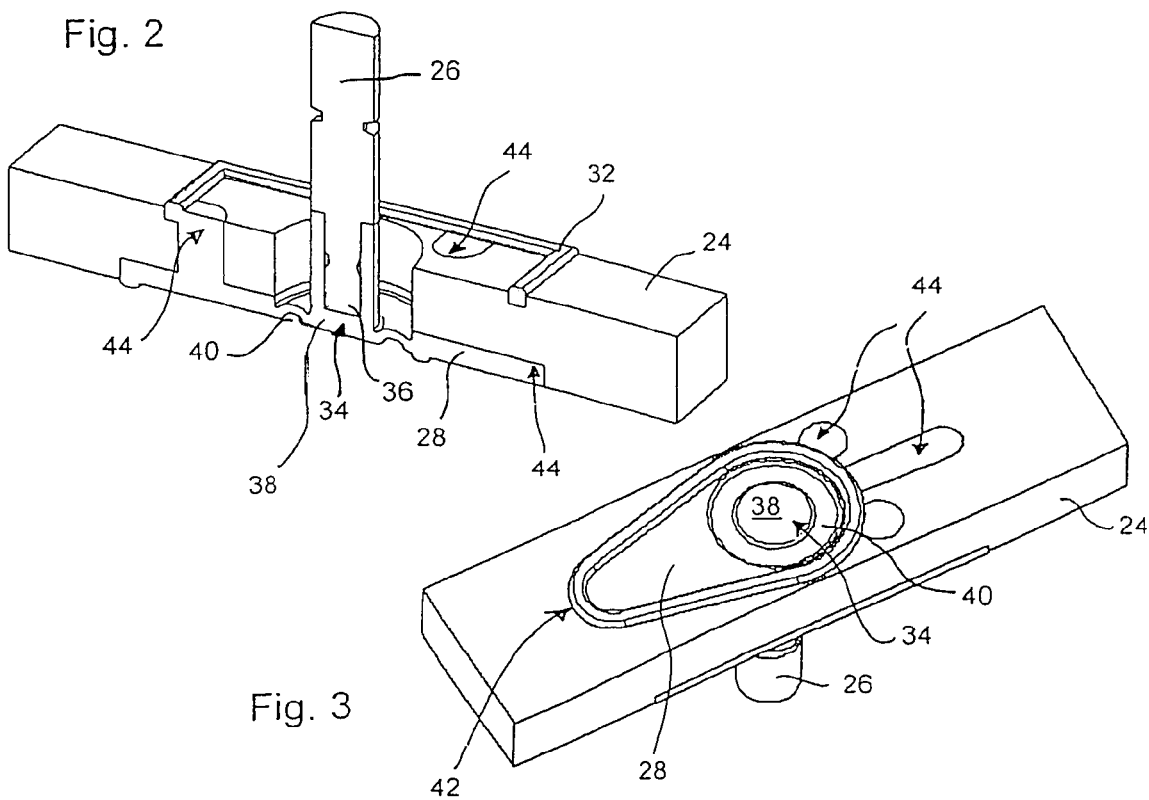

a)

b)

e)

c)            d)

VALVE DEVICE HAVING A VALVE CONTROL MEMBER FORMED BY MOLDING

FIELD OF THE INVENTION

The invention relates to a valve device and to a method of manufacturing a valve control member for a valve device.

BACKGROUND OF THE INVENTION

Valve devices known from the prior art generally have a housing body with a fluidic chamber, with two or more flow ducts opening into the fluidic chamber, and with a valve seat associated with at least one of the flow ducts. Further provided is a valve body which can be moved by a valve drive between a closed position, in which it covers the valve seat, and an open position, in which it exposes the valve seat. Where the valve device involves separation of media, the valve drive is sealed from the fluidic chamber by a flexible diaphragm. This means that a valve device of this type is composed of several parts, which is problematic in particular in the design of a miniaturized valve since the tolerances caused by the manufacture of the individual components and the assembly thereof are very hard to control in cases where very small structures are involved. More particularly, such tolerances may add up in an undesirable manner.

SUMMARY OF THE INVENTION

The invention, by contrast, provides a valve device and a method of manufacturing a valve control member for such a valve device which distinguishes itself by very small manufacturing and assembly tolerances.

According to the invention, this is achieved by a valve device comprising a housing body having a fluidic chamber formed therein which has at least one valve seat, and a valve control member produced in one piece by a molding technique to include a rigid frame and a flexible diaphragm with at least one valve body integrated therein, the valve control member being placed on the housing body, its diaphragm tightly sealing the fluidic chamber thereof, and with its valve body located opposite the valve seat. Rather than a plurality of separate components, aside from the housing body the valve device according to the invention thus merely has a valve control member that is produced in one piece in a molding procedure and therefore merely exhibits a tolerance resulting from the molding process. In this way, it is possible to produce valve devices that are smaller than 4.5 mm in one dimension. Examples of suitable applications of these valve devices include medical technology, measuring engineering, biotechnology, communications engineering, physics and chemistry.

Preferably, a rigid actuating member is connected to the diaphragm by a molding technique. This actuating member can then be acted upon by any desired valve drive for moving the valve body, which is formed by a section of the actuating member, between its open position and its closed position.

According to a preferred embodiment, the valve control member is produced by multicomponent injection-molding. In this process, first the rigid frame and, if appropriate, a rigid actuating member are molded from a first plastic component and are then encased by molding with a rubber material that forms the flexible diaphragm. In manufacturing the rigid parts, it is advantageous to use a plastic material that withstands high thermal stresses. This allows to make the diaphragm from a rubber material having a high vulcanization temperature. It is, of course, likewise possible to fabricate the frame and, where required, the actuating member from some other thermally stable material such as glass or metal, for example, merely followed by encasing with the rubber material using a molding process. Both manufacturing methods described allow the functional tolerances of the originally three individual parts, i.e. the frame, the diaphragm and the actuating member, to be reduced to one tolerance for the diaphragm, as caused by the molding procedure.

The frame of the valve control member may have recesses for a form-fitting connection with the diaphragm. This results in a stable connection between the different materials. A connection produced by a frictional fit is also possible in that during vulcanization the rubber material of the diaphragm is shrunk onto a subsequently inserted actuating member, for example.

According to one embodiment of the invention, the actuating member is an insert encased by molding with the material of the diaphragm. As an alternative, the actuating member may, of course, be produced in a first molding step, or else may be inserted into the valve control member later, as already described above.

The actuating member may be a rocker body or a tappet. Where a rocker body is used, it is possible to alternately close and expose two valve seats.

The largest dimension of the valve control member preferably amounts to up to 16 mm; according to an especially preferred embodiment, the largest dimension is even as small as up to 4.5 mm. Such small structures have not previously been realizable due to the tolerances in manufacturing and assembly of the individual components as mentioned above.

According to a second aspect of the invention, a method of manufacturing a valve control member for a valve device is provided, the valve control member including a rigid frame, a flexible diaphragm with at least one valve body integrated therein, and at least one rigid actuating member. The method comprises the following steps: First, the frame and the actuating member are positioned inside a mold. Subsequently, the frame and the actuating member are encased by molding with an elastomer inside the mold, and the composite part consisting of the frame, the actuating member, and the diaphragm is removed from the mold. The valve control member manufactured in this way distinguishes itself, as already mentioned, by a very small tolerance resulting merely from the molding process. Moreover, the method according to the invention is very simple and therefore reasonably priced.

In a first variant of the method, provision is made to mold the frame and the actuating member from plastic inside the mold. So the frame and the actuating member are the first components in a multicomponent injection-molding process, which, in a second step, are encased by molding with the elastomer forming the diaphragm.

According to a second variant of the method, the frame and the actuating member are placed inside the mold as inserts. Subsequently, the inserts are encased by molding with the elastomer material.

BRIEF DESCRIPTION OF THE DRAWINGS

Further features and advantages of the invention will be apparent from the following description of several preferred embodiments with reference to the accompanying drawings, in which:

FIG. 1 shows a sectional view of a valve device according to a first embodiment of the invention;

FIG. 2 shows a perspective sectional view of a valve control member as is used in the valve device according to FIG. 1;

FIG. 3 shows a perspective view of the side of the valve control member of FIG. 2 facing the fluidic chamber of the valve device;

DETAILED DESCRIPTION OF THE INVENTION

Figure 4:
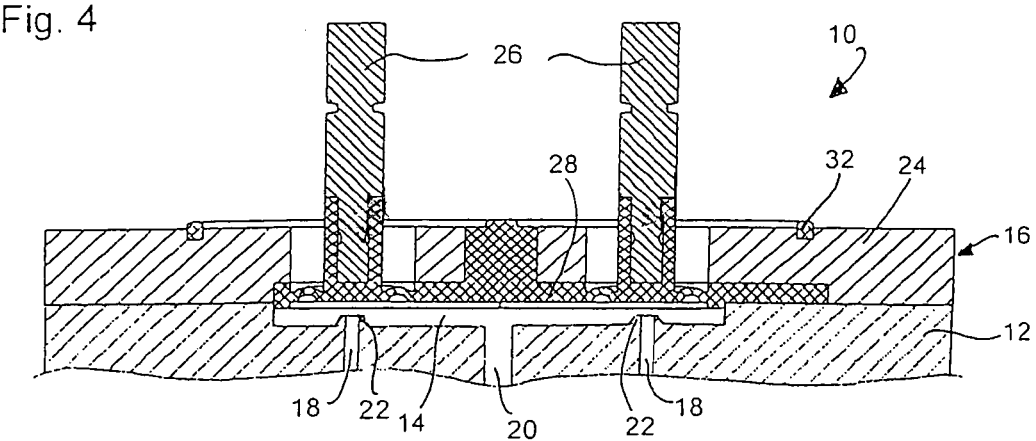
FIG. 4 shows a sectional view of a valve device according to a second embodiment of the invention.
Figure 5:
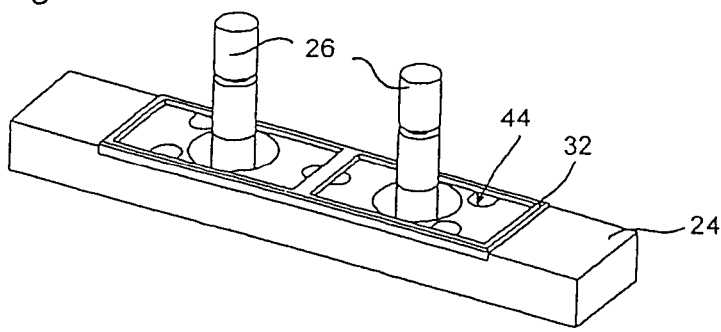
FIG. 5 shows a perspective view of the valve control member of FIG. 4.
Figure 6:
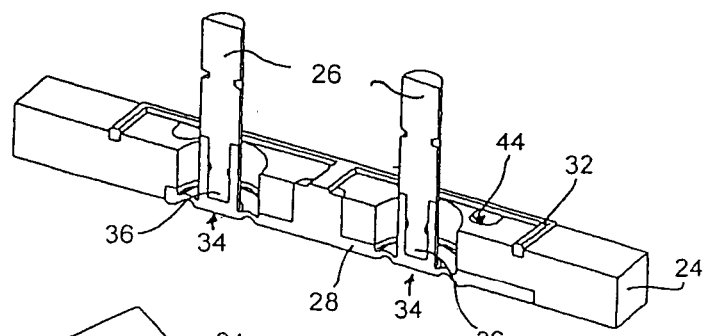
FIG. 6 shows a perspective sectional view of the valve control member of FIG. 4.
Figure 7:
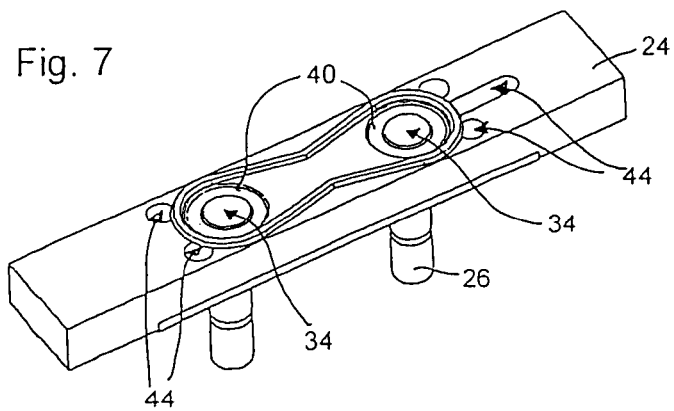
FIG. 7 shows a perspective view of the side of the valve control member of FIG. 4 facing the fluidic chamber of the valve device.

FIG. 1 shows a valve device 10 which includes a housing body 12 having a fluidic chamber 14 formed therein and a valve control member 16 connected with the housing body 12. Preferably, the valve device 10 is a so-called miniaturized valve which has an especially small overall width of less than 4.5 mm. The housing body 12, on the one hand, and the valve control member 16, on the other hand, constitute two independent, interconnected component parts.

Two flow ducts for a fluid medium open into the fluidic chamber 14, one of the flow ducts being configured as an inlet duct 18, the other as an outlet duct 20. The inlet duct 18 has a valve seat 22.

The valve control member 16, which is illustrated separately in FIGS. 2 and 3, comprises a rigid frame 24, a rigid actuating member 26 in the form of a tappet, and a flexible diaphragm 28, the diaphragm 28 being produced integrally with the frame 24 and the actuating member 26 in a multi-component injection-molding process. The diaphragm 28 is vulcanized together with the frame 24 and the actuating member 26. In the process, the rubber material of the diaphragm 28 will shrink onto the actuating member 26, resulting in the production of a frictional connection. Both the frame 24 and the actuating member 26 are made of a plastic material having a high thermal stability.

In addition to the diaphragm 28, further sealing contours 32 are provided on the valve control member 16, which are arranged on the side of the valve control member 16 facing away from the fluidic chamber 14. On this side, any desired valve drive may be arranged, which cooperates with the actuating member 26 by moving it in the vertical direction (in the illustration of FIGS. 1 and 2), in order to cause a valve body 34 to engage, or disengage from, the valve seat 22 in this way. The valve body 34 is formed by a section 36 of the actuating member 26 facing the chamber 14 and by the section 38 of the diaphragm 28 surrounding the section 36, which means the valve body 34 is directly integrated into the diaphragm 28.

The valve body 34 is surrounded by a groove 40 in the diaphragm 28, which makes an actuation of the valve body 34 significantly easier since the diaphragm 28 is made to be very much thinner in the area of the groove 40 and therefore offers less resistance to actuation. The design of the diaphragm 28 with a tapered end 42 in the area of the outlet duct 20 results in a particularly low clearance volume.

The frame 24 has a plurality of recesses 44, which serve to attain the form-fitting connection with the diaphragm 28. To this end, when the diaphragm 28 is produced, the recesses 44 are also filled with the rubber material forming the diaphragm 28.

The embodiment shown in FIGS. 4 to 7 differs from the first embodiment shown in FIGS. 1 to 3 merely in that two valve seats 22 and, consequently, two valve bodies 34 are provided, sharing a diaphragm 28, the valve bodies 34 being adapted to be actuated independently of each other. Since the second embodiment otherwise corresponds to the first embodiment, it is not discussed in greater detail.

Figure 8:
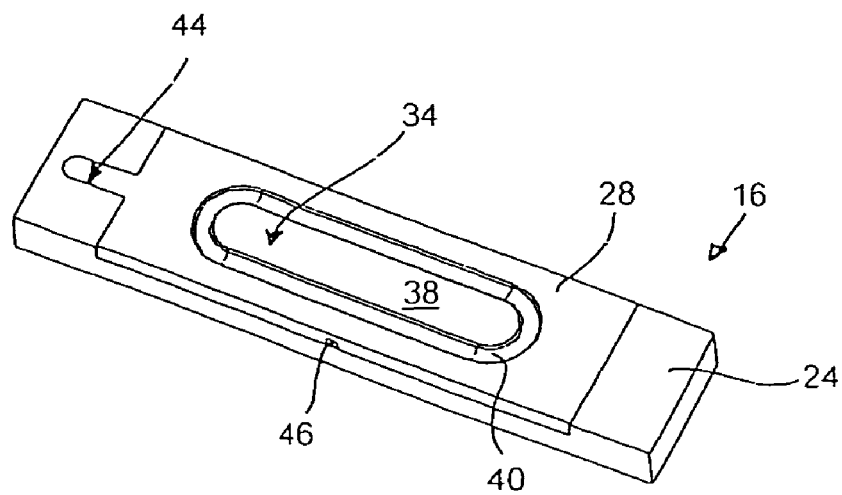
FIG. 8 shows a perspective view of a valve control member according to a third embodiment of the invention, as viewed from the fluidic chamber of a valve device.
Figure 9:
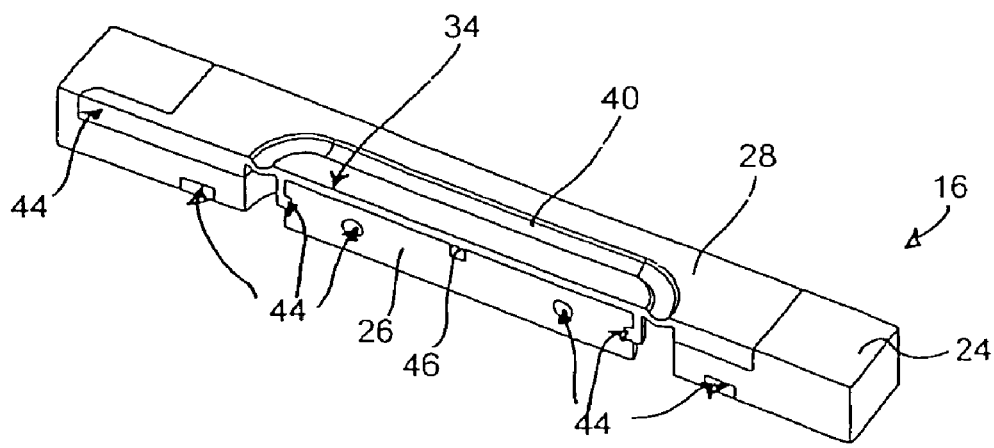
FIG. 9 shows a perspective sectional view of the valve control member of FIG. 8.
Figure 10:
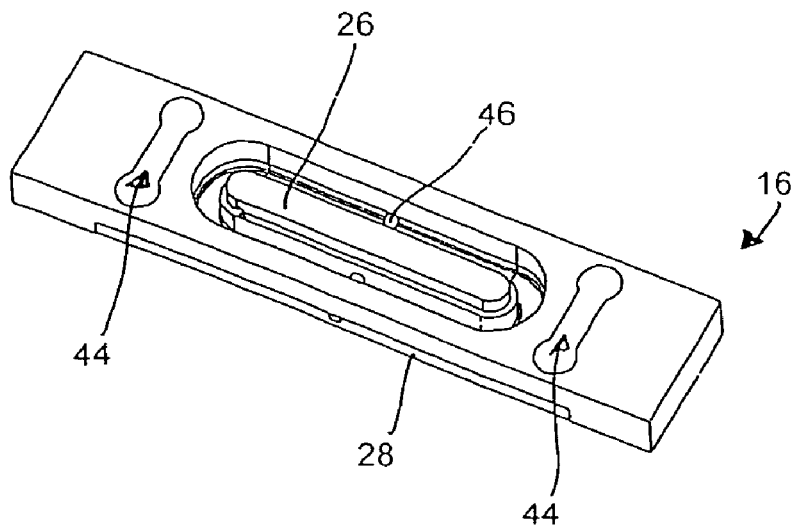
FIG. 10 shows a perspective view of the valve control member of FIG. 8, as viewed from an actuation side.

Finally, FIGS. 8 to 10 show a valve control member 16 as is used in a valve device according to a third embodiment. Here, too, only the differences from the first and second embodiments described will be discussed, with like components bearing the same reference numbers. Rather than a tappet, the valve control member 16 according to FIGS. 8 to 10 includes a rocker body to act as the actuating member 26, which is made as an insert and is encased by molding with the material of the diaphragm 28. The rocker body is mounted in the frame 24 by means of a rigid pin 46 and may be actuated for example by a magnetic drive such that two valve seats, arranged on either side of the pin 46, are opened and closed alternately. Apart from the frame 24, the rocker body also has recesses 44 for producing a form-fitting connection with the diaphragm 28. The rocker body thus constitutes two integrally formed valve bodies 34 for two valve seats.

Figure 11:
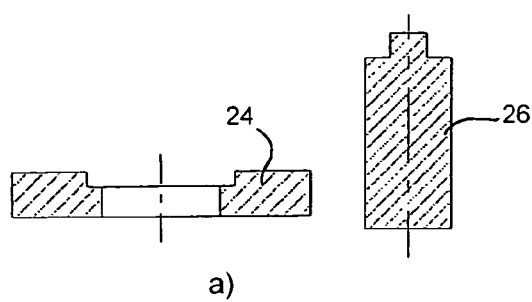
FIG. 11 shows a schematic illustration of the method according to the invention.
Figure 11:
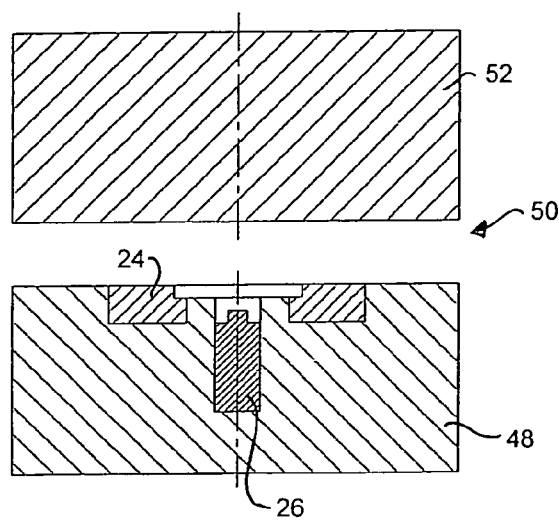
Figure 11:
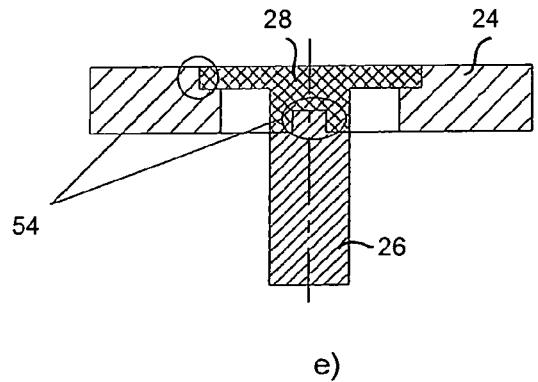
Figure 11:
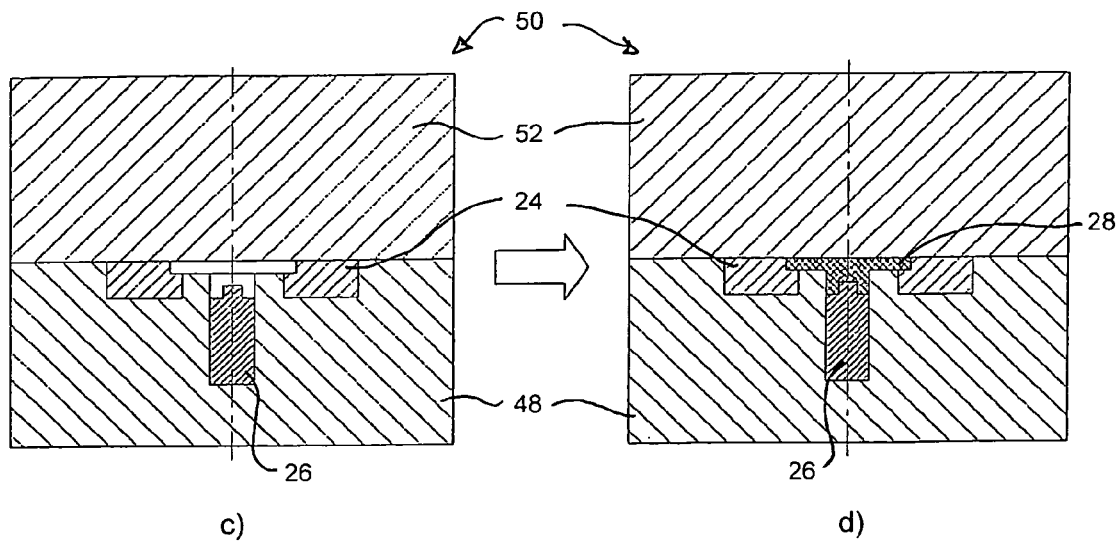

In the following, the manufacture of a valve control member 16 is explained with the aid of FIG. 11. At first, the frame 24 and the actuating member 26, here a tappet, are prefabricated (FIG. 11a) and positioned as inserts in a first half 48 of a mold 50 (FIG. 11b). Alternatively, the frame 24 and the actuating member 26 can be manufactured directly inside the mold 50 by an injection-molding process. Subsequently, as shown in FIG. 11c, the mold 50 is closed by a second half 52, and the frame 24 and the actuating member 26 are encased by molding inside the mold 50 with an elastomer forming the diaphragm 28 (FIG. 11d). Finally, the composite part consisting of the frame 24, the actuating member 26, and the diaphragm 28 is removed from the mold 50. On account of the special shaping of the frame 24 and the actuating member 26, the finished composite part, as shown in FIG. 11e, includes several regions 54 with a form-fitting connection.

The invention claimed is:

1. A valve device comprising
    a valve housing body having a fluidic chamber formed therein which has at least one valve seat, and
    a valve control member that is produced in one piece by multi-component injection-molding and that includes
        a rigid frame, said rigid frame having a first surface and a second surface opposite said first surface and being shaped with recesses, at least one of said recesses extending from said first surface to said second surface,
        a rigid actuating member, and
        a flexible diaphragm on said first surface which is connected with said rigid frame and said rigid actuating member by said injection-molding technique, whereby said recesses are filled with material from which the diaphragm is molded and wherein at least one valve body is formed by a section of the actuating member and a section of the diaphragm surrounding said actuating member and sealing contours are formed on said second surface from said material from which the diaphragm is molded, and the valve control member is joined with the valve housing body so that the diaphragm closes and tightly seals the fluidic chamber and that the valve body is located opposite the valve seat.

2. The valve device according to claim 1, wherein the actuating member is an insert encased by molding with the material of the diaphragm.

3. The valve device according to claim 1, wherein the actuating member is a rocker body.

4. The valve device according to claim 1, wherein the actuating member is a tappet.

5. The valve device according to claim 1, wherein the largest dimension of the valve control member is up to 16 mm.

6. The valve device according to claim 1, wherein the largest dimension of the valve control member is up to 4.5 mm.

7. The valve device according to claim 1, wherein said valve housing body has at least one outlet duct and wherein said diaphragm has a tapered end in the area of said outlet duct.

* * * * *